United States Patent [19]
Berriman et al.

[11] Patent Number: 5,992,141
[45] Date of Patent: Nov. 30, 1999

[54] AMMONIA INJECTION IN NOX CONTROL

[75] Inventors: Lester P. Berriman, Irvine; John M. Zabsky, Santa Ana; William H. Ward, Costa Mesa, all of Calif.

[73] Assignee: Kleen Air Systems, Inc., Irvine, Calif.

[21] Appl. No.: 08/816,796

[22] Filed: Mar. 19, 1997

Related U.S. Application Data

[60] Provisional application No. 60/014,660, Apr. 2, 1996, and provisional application No. 60/020,007, Jun. 18, 1996.

[51] Int. Cl.⁶ .................................................. F01N 3/00
[52] U.S. Cl. ............................ 60/274; 60/286; 60/275; 60/301; 60/303
[58] Field of Search ............................ 60/274, 275, 286, 60/301, 303

[56] References Cited

U.S. PATENT DOCUMENTS

| | | |
|---|---|---|
| 4,403,473 | 9/1983 | Gladden . |
| 4,478,177 | 10/1984 | Valdespino ............................ 123/575 |
| 4,912,776 | 3/1990 | Alcorn ................................. 423/239 |
| 4,912,928 | 4/1990 | Kaneko et al. ......................... 60/298 |
| 5,224,346 | 7/1993 | Berriman et al. . |
| 5,240,688 | 8/1993 | van Harpe et al. .................... 423/235 |
| 5,397,545 | 3/1995 | Balling et al. ......................... 422/171 |
| 5,412,946 | 5/1995 | Oshima et al. ......................... 60/286 |
| 5,431,893 | 7/1995 | Hug et al. ............................ 423/234.1 |
| 5,431,894 | 7/1995 | Onishi et al. ......................... 423/239.1 |
| 5,435,976 | 7/1995 | Berner et al. ......................... 422/168 |
| 5,547,650 | 8/1996 | Edgar et al. ............................ 423/235 |
| 5,606,856 | 3/1997 | Linder et al. .......................... 60/286 |
| 5,611,198 | 3/1997 | Lane et al. ............................ 60/299 |
| 5,643,536 | 7/1997 | Schmelz .............................. 422/105 |
| 5,693,300 | 12/1997 | Slone .................................. 423/235 |

FOREIGN PATENT DOCUMENTS

| | | |
|---|---|---|
| 0 381 236 A1 | 8/1990 | European Pat. Off. . |
| 3-206314 | 9/1991 | Japan ................................... 60/286 |
| 2 274412 | 1/1993 | United Kingdom . |

Primary Examiner—Thomas E. Denion
Attorney, Agent, or Firm—Leon D. Rosen; Arthur Freilich; Robert Hornbaker

[57] ABSTRACT

Improvements are described in the injection of ammonia ($NH_3$) into the exhaust gases of an engine to reduce nitrogen oxides. Instead of merely injecting ammonia into the exhaust gas conduit through a hole in its side, an ammonia injector (90) is provided that projects considerably into the exhaust conduit (16), with the injector having a plurality of holes (94). The ammonia is activated to decompose it into its reactive components, including $NH_2$ and NH prior to injecting it into the exhaust conduit. Such activation prior to injection can be accomplished by heating the ammonia in the presence of a catalyst such as a metal of the platinum group, iron, nickel, or zinc. In an engine that has a fuel injection system wherein electrical pulses are delivered to fuel injectors to control the fuel flow rate, the durations of these electrical signals are used to control the opening of a valve (72) that controls the flow rate of ammonia into the exhaust gas conduit.

15 Claims, 4 Drawing Sheets

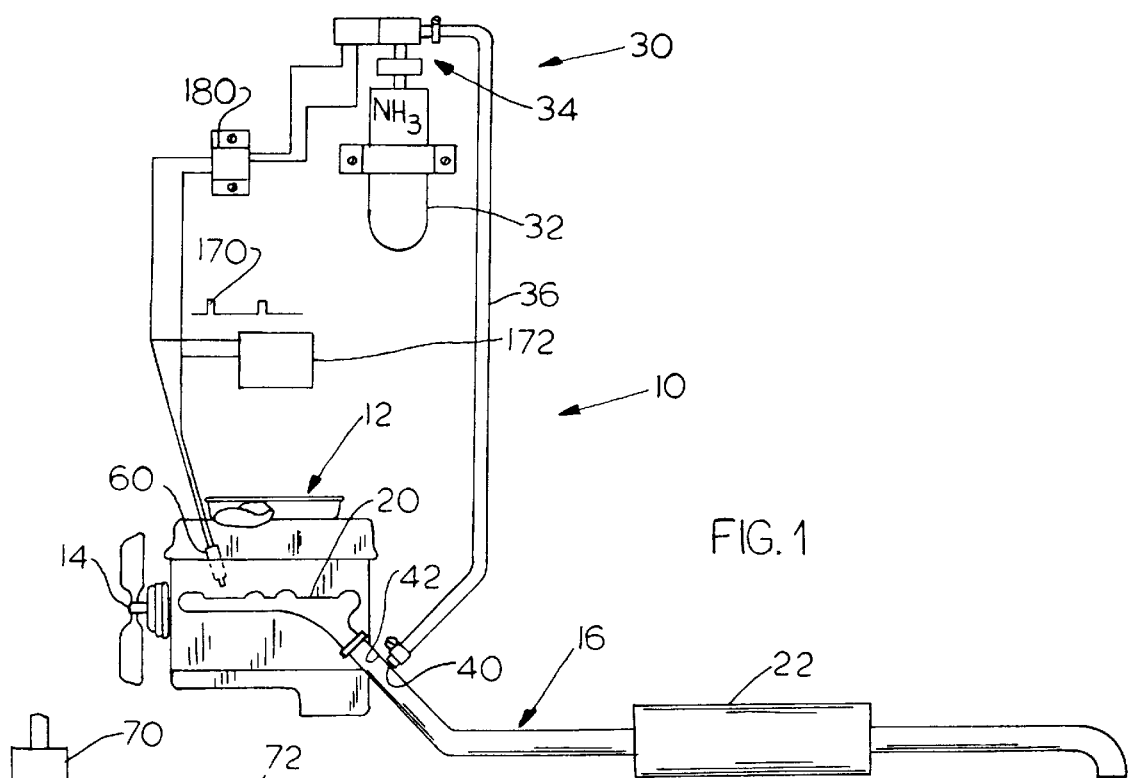
FIG. 1
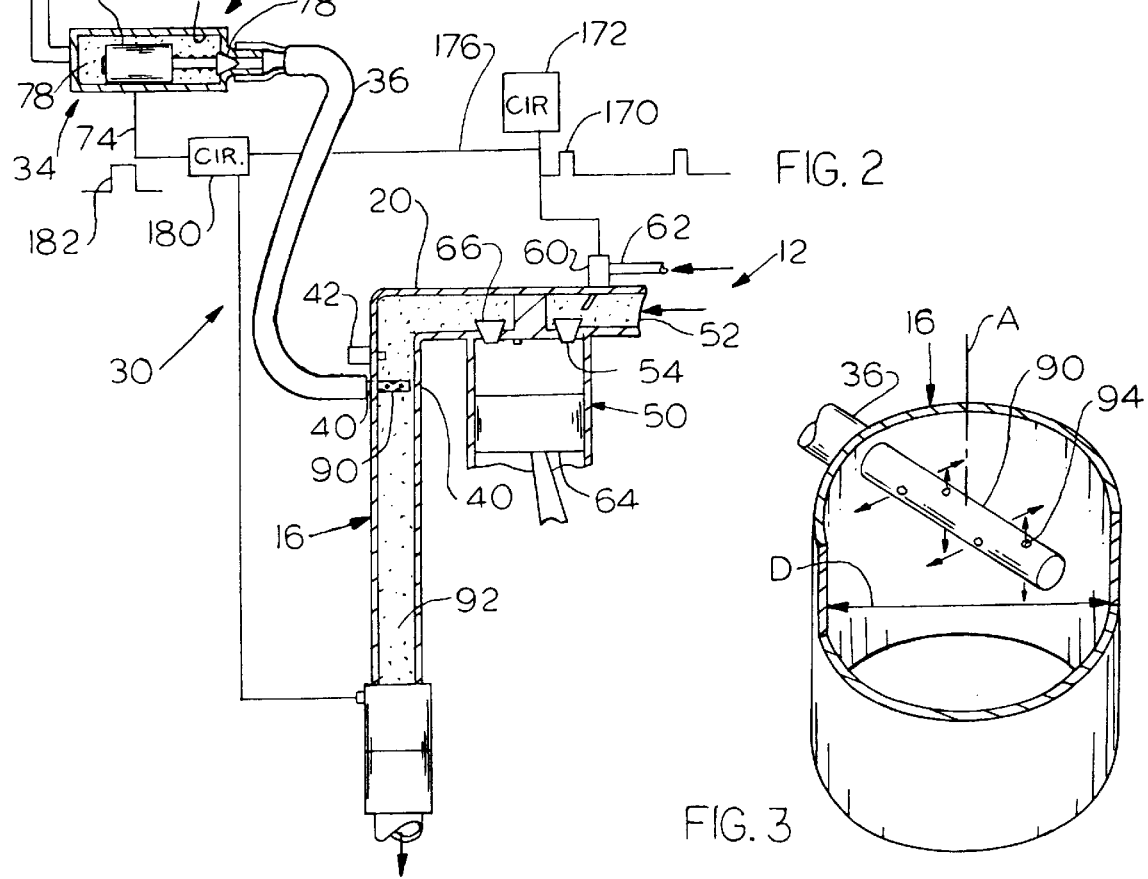
FIG. 2
FIG. 3

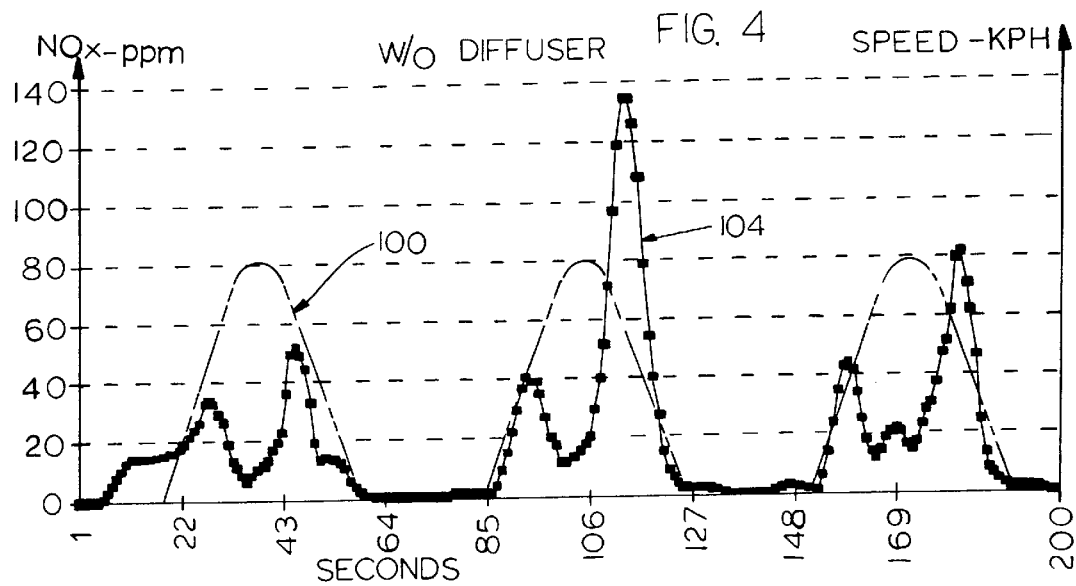
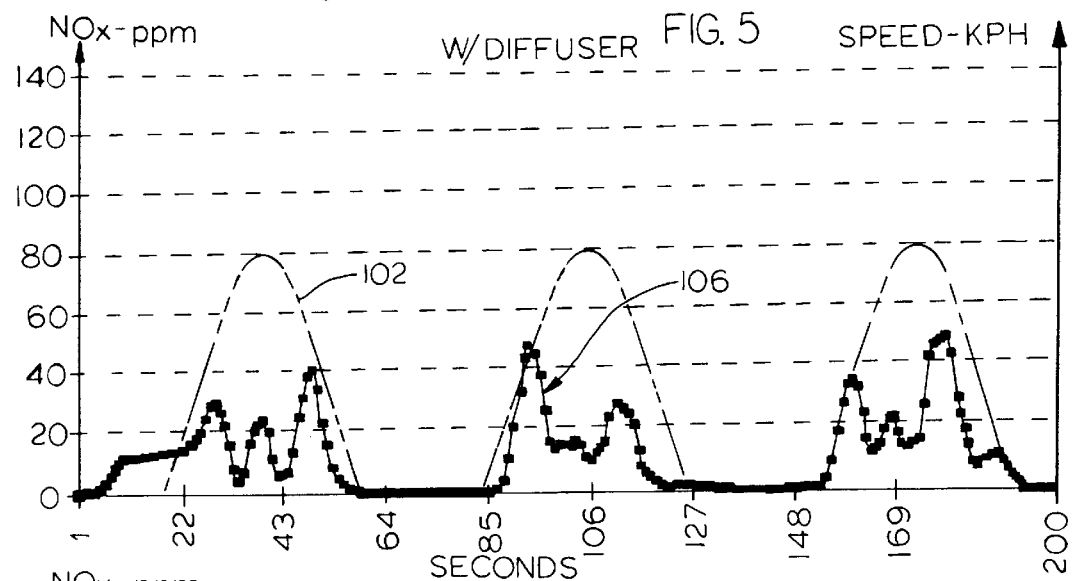
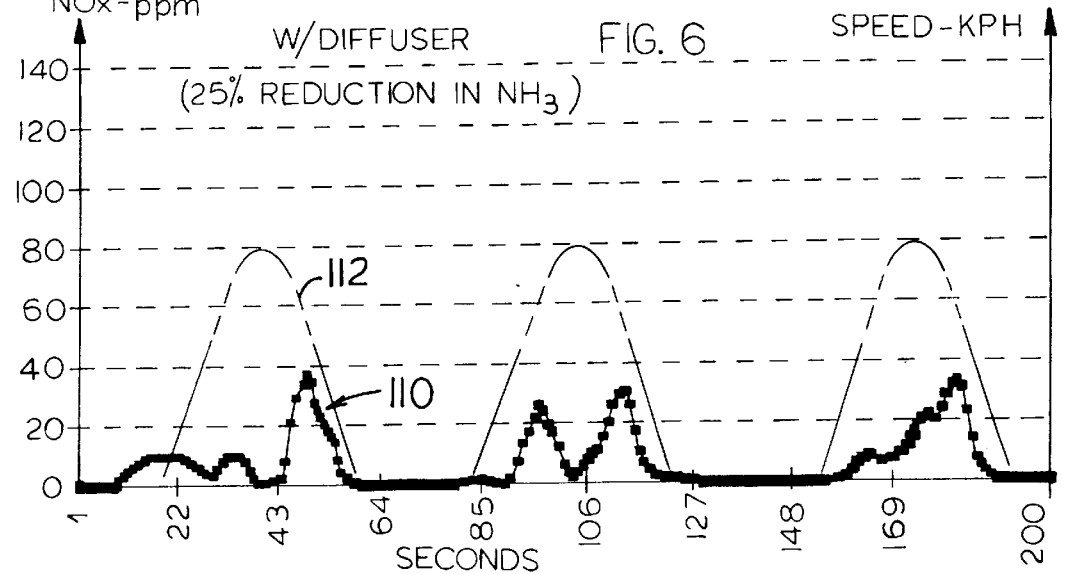

AMMONIA INJECTION IN NOX CONTROL

CROSS-REFERENCE TO RELATED CASES

This application claims the benefit of U.S. Provisional Applications Nos. 60/014,660 filed Apr. 2, 1996 and 60/020,007 filed Jun. 18, 1996.

BACKGROUND OF THE INVENTION

In our earlier U.S. Pat. No. 5,224,346, we describe experiments which show that the amount of nitrogen oxides (NO and $NO_2$), or NOx in engine exhaust gases can be reduced by injecting ammonia ($NH_3$), which reacts with nitrogen oxides to produce nitrogen and water. As described in that patent, it is desirable to control the amount of ammonia injected so it is generally proportional to the production of NOx. Ammonia injection generally is not required when a warmed-up engine is idling or the like, when the relatively small amount of NOx can be eliminated by the hot catalytic converter. At other times, the amount of NOx produced, and consequently the amount of ammonia to be injected, is indicated by the amplitude of many phenomena. These include the exhaust temperature, the air inlet manifold pressure, and the flow rate of fuel or air into the engine. Special sensors could be installed in an engine and connected to control circuitry that controls ammonia injection, but the installation of such sensors increases the cost for an ammonia injection system. A control for an ammonia injection system which avoided the need for installation of a special sensor, would greatly reduce the cost of an ammonia injection system.

In the above-mentioned U.S. Pat. No. 5,224,346, applicant described the injection of ammonia through a small tube having an opening pointed downstream along the exhaust gas flow. Although such injector tube lay near the upper end of the exhaust gas conduit where exhaust gases are very hot, the exhaust gases cool quickly and the ammonia was not rapidly mixed with the exhaust gases. As a result, a large part of the ammonia did not effectively combine with nitrogen oxides in the exhaust gases. An ammonia injection system which increased the amount of ammonia that reacted with nitrogen oxides in the exhaust gases, would reduce the amount of ammonia required and decrease the amount of nitrogen oxides emitted into the atmosphere.

SUMMARY OF THE INVENTION

In accordance with one embodiment of the present invention, a system is provided for injecting ammonia into the exhaust gases of an engine, which increases the amount of ammonia that combines with nitrogen oxides in the exhaust gases, in a low cost system. Instead of injecting ammonia through a single hole into the exhaust gas stream, applicant injects the ammonia through a plurality of spaced holes lying in the stream. Also, applicant can mix the exhaust gases as by providing a mixer section of the exhaust gas conduit that includes mixing blades.

Reactions of the ammonia with nitrogen oxides in the exhaust gases is greatly enhanced by activating the ammonia prior to injecting it into the stream of exhaust gases. The activation of the ammonia ($NH_3$) first splits it into $NH_2+H$, with $NH_2$ being very reactive. The $NH_2$ can further decompose into $NH+H$, with $NH$ also being very reactive. The activation of ammonia immediately prior to its injection, results in the very reactive components being present at an upstream location along the flow of exhaust gases where the exhaust gases are very hot, to enhance chemical reactions. The activation of ammonia can be accomplished by heating it, especially in the presence of certain catalyzing materials that include metals of the platinum group, iron, nickel, and zinc, which enhance the reaction. One approach is to place a body packed with particles of the catalyzing material, in the stream of exhaust gases so the body is heated to a high temperature. Ammonia must pass through long narrow passages in moving through the body to outlet holes in the body, so the ammonia is heated and thereby activated as it moves through the body.

A control that adjusts the flow of ammonia to increase or decrease it as the amount of nitrogen oxides in the exhaust gases respectively increase and decrease, does not require a specially installed sensor. Instead, applicant uses the electrical signals delivered to an injection valve of the engine, that injects fuel into air to burn therewith, as a sensor output that controls the flow rate of ammonia into the exhaust gas stream.

The novel features of the invention are set forth with particularity in the appended claims. The invention will be best understood from the following description when read in conjunction with the accompanying drawings.

BRIEF DESCRIPTION OF THE DRAWINGS

FIG. 1 is a simplified schematic view of an engine, with pollution reduction apparatus of the present invention installed therein.

FIG. 2 is a schematic diagram of a portion of the engine and pollution reduction apparatus of FIG. 1.

FIG. 3 is a partial sectional isometric view of the injector and a portion of the exhaust pipe of FIG. 2.

FIG. 4 includes a first graph showing variation in speed of an engine and a second graph showing the level of nitrogen oxides produced by the engine at the different speeds, when ammonia was injected through a single port into the exhaust pipe.

FIG. 5 contains a first graph showing variation in engine speed which is the same as in FIG. 4, and containing a second graph showing variation in the generation of nitrogen oxides when ammonia was injected into the same location of the exhaust pipe, but through the injector of FIG. 3.

FIG. 6 includes a first graph showing variation in engine speed which is the same as in FIGS. 4 and 5, and a second graph showing variation in generation of nitrogen oxides, using the same injector as for FIG. 5 but with the amount of injected ammonia reduced by 25%.

DESCRIPTION OF THE PREFERRED EMBODIMENTS

Figure 7:
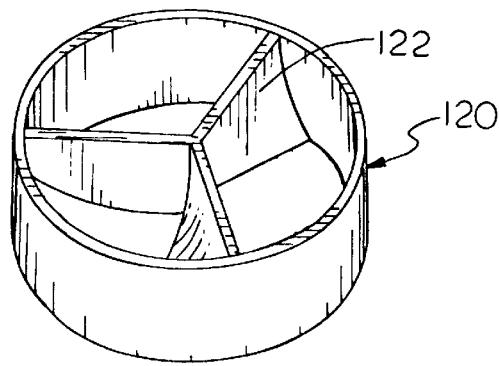
FIG. 7 is an isometric view of a mixer section that can be installed in the exhaust pipe of FIG. 3.

FIG. 1 illustrates a system 10 of the present invention, wherein an engine 12 has cylinders in which fuel and air are combusted to turn a crank shaft 14. The combustion produces hot exhaust gases that are passed through an exhaust conduit 16 into the atmosphere. The exhaust conduit includes a manifold 20 that is connected to a few cylinders to collect the exhaust gases therefrom; a catalytic converter 22 that lies along the exhaust conduit, is widely used in vehicle engines to reduce pollution.

FIG. 1 shows an ammonia injection system 30 that includes a container 32 of ammonia, such as a pressure vessel containing liquid ammonia at a pressure of about 150 psi. The container or source 32 delivers ammonia through a metering valve apparatus 34 and through a hose 36 to an ammonia injection location 40 that is positioned along the exhaust pipe or conduit 16. The location 40 where ammonia is injected into the exhaust pipe, is in or close to the exhaust manifold 20, so the ammonia encounters very hot exhaust gases (usually over 1100° F. at high engine loads) to promote the reaction of ammonia and the exhaust gases to reduce nitrogen oxides. When the catalytic converter 22 is heated, after a few minutes of engine operation, its noble metal catalyst will further react ammonia with nitrogen oxides (even though the temperature of the exhaust gases is much lower at the catalytic converter than near the exhaust manifold). Although applicants wish to inject the ammonia where the exhaust gases are hottest (but not near an open flame) applicants have placed the injection location 40 slightly downstream of a location 42 where an engine oxygen sensor is typically located in modern engines, so the injection of ammonia will not interfere with accurate oxygen sensing.

FIG. 2 shows some details of the engine 12 and of the ammonia injection system 30. An engine cylinder 50 receives air through an air manifold 52 and an inlet valve 54. A fuel injector 60 receives fuel from a fuel line 62 and injects the fuel through the inlet valve 54 into the cylinder, where a spark plug or the like ignites the fuel-air mixture to drive a piston 64 that is connected to the crankshaft. Exhaust gases created in the cylinder are exhausted through an exhaust valve 66, and to the exhaust manifold 20 which is part of the exhaust conduit 16, and eventually into the environment.

The metering valve apparatus 34 of the ammonia injection system includes a pressure regulator 70 that supplies pressured gaseous ammonia to a solenoid valve 72. Electrical pulses delivered over a line 74 to the solenoid valve, energize a solenoid 76 to retract a valve member 78. This allows gaseous ammonia 78 lying in a chamber or conduit 80 to flow through the hose 36 to an injector 90 at location 40. The injector 90 injects the ammonia, or components of it, into the stream of exhaust gas 92, preferably at the location slightly downstream of the air sensor at 42.

FIG. 3 illustrates a diffuser ammonia injector 90 that applicant has constructed and successfully tested. The injector 90 is a tube having a diameter of 6 mm and a length of 50 mm and projecting into an exhaust conduit of a diameter D of about 60 mm. Applicant drilled eight holes 94 into the tube, with two holes each facing upstream, downstream, and in opposite sideward directions. The hose 36 carrying pressured (such as up to 10 psi, or 70 kPa) ammonia was attached to the tube as shown. Applicant found that there was a significant reduction in nitrogen oxides in the exhaust gases, as a result of the use of the diffuser construction of the injector 90, in the place of a single port opening into the exhaust pipe. Applicant believes that this reduction was due to the mixing of the ammonia with the exhaust gases as quickly as possible, while the exhaust gases are still very hot. It is preferred that the injector or injectors have holes 94 on primarily opposite sides of the exhaust conduit axis A.

FIGS. 4 and 5 include graphs showing variation in the levels of nitrogen oxides in the exhaust gas of an engine of an automobile (1991 Chevrolet) containing an engine (8-cylinder 305 cubic inch displacement) when the automobile was driven at a speed cycle similar to that of a standard federal driving cycle. The speed of the engine in kilometers per hour is indicated at the right vertical axis of the graph, while the time during the test is given in seconds along the horizontal axis of the graphs. The emission of nitrogen oxide in ppm (parts per million) is indicated along the left vertical axis of each graph. First lines 100, 102 in FIGS. 4 and 5 indicate variation in speed of the vehicle with time, showing that the vehicle was repeatedly accelerated from 0 to 80 kph (50 miles per hour) and then decelerated to zero, during periods of about 44 seconds each, with the engine idling between these periods. Graphs 104 and 106 show the variation in emissions of nitrogen oxides. The rate of ammonia injection (0.51 liter per minute of ammonia at atmospheric pressure at a constant speed of 10 mph, with the rate proportional to fuel flow) in FIGS. 4 and 5 were substantially the same (per unit fuel) during each test. The difference between FIGS. 4 and 5, is that in FIG. 4 ammonia was injected through a single port directed downstream (as shown in U.S. Pat. No. 5,224,346), while in FIG. 5 ammonia was injected through a diffuser injector of the construction shown at 90 in FIG. 3. It can be seen in FIG. 5, that the amount of resulting nitrogen oxides produced when the diffuser injector of FIG. 3 was used, was significantly lower than the amount of nitrogen oxides produced in FIG. 4.

FIG. 6 contains a graph 110 showing variation in nitrogen oxides during the same type of vehicle operating cycles shown in FIGS. 4 and 5 (speed indicated by graph 112), and using the same injector as for FIG. 5, except that in FIG. 6 the amount of injected ammonia was reduced by 25%. This indicates that there should be close control of the amount of ammonia, so that there is neither too little nor too much. When no ammonia was injected, the amount of nitrogen oxides was about twice as great as the amount shown in FIG. 4.

FIG. 7 shows a mixer section 120 that can be installed in the exhaust pipe (either slightly upstream or downstream of the injector) to cause a swirling of the exhaust gases near the injection location. Such swirling helps to rapidly distribute injected ammonia throughout the exhaust gas while it is still hot. The particular mixer section 120 includes stationary mixing blades 122 which direct the gas into a swirl. The length of the mixer section 152 can be minimal, so the injector lies close to the exhaust manifold. A variety of mixers can be used, including those with a rotating fan blade and those where turbulence is created immediately downstream of the injector. In all of these, care must be taken to not significantly block the outflow of exhaust gases.

It has been known that in order for ammonia to react with nitrogen oxides, the ammonia must first start to decompose. Ammonia ($NH_3$) first splits into $NH_2$+H. The $NH_2$ is a very reactive form which can readily react with nitrogen oxides. The $NH_2$ can further decompose into NH+H with NH also being reactive. The decomposition of ammonia into $NH_2$ and/or NH,+H, begins (in the absence of a catalyst) at temperatures in the range of 900 to 1000 degrees F., and is essentially complete at 1800° F. In the presence of a catalyst of the type (platinum group) found in modern automobiles, the decomposition occurs at lower temperatures, usually starting at about 500° F. and being essentially complete at 1100° F. It is also known that the decomposition of $NH_3$ tends to occur in the presence of certain materials in addition to metals of the platinum group, including iron, nickel, and zinc. When ammonia is split into the components $NH_2$ and/or NH,+H, these components combine back into ammonia when the decomposing environment is no longer present.

In accordance with another aspect of the invention applicant decomposes, or activates, ammonia ($NH_3$) to convert a substantial portion of it (at least 10% and preferably at least 20%) into its active components $NH_2$ and/or NH shortly before or during injection of ammonia into the stream of engine exhaust gases. By activating ammonia shortly before or during injection, applicant injects highly reactive ammonia components ($NH_2$ and/or NH) directly into the stream of engine exhaust gas. Since the temperature of the exhaust gas quickly decreases as it rapidly moves from a location where fuel is burned (usually in cylinders) to the opposite end of the exhaust pipe that opens to the environment, it is desirable that the reaction components be present as far upstream as possible (but not where there is an open flame). The above approach avoids wasting a considerable portion of injected ammonia that previously might not break down into its reactive components, or that might break down later. Components that break down later (perhaps a second after injection) when they have traveled a considerable distance along the exhaust pipe, results in reactive components available only at lower temperatures so less of them react with nitrogen oxides in the exhaust gas. Applicant's description of "injecting ammonia" includes injecting ammonia that has not decomposed as well as ammonia that has decomposed.

Figure 8:
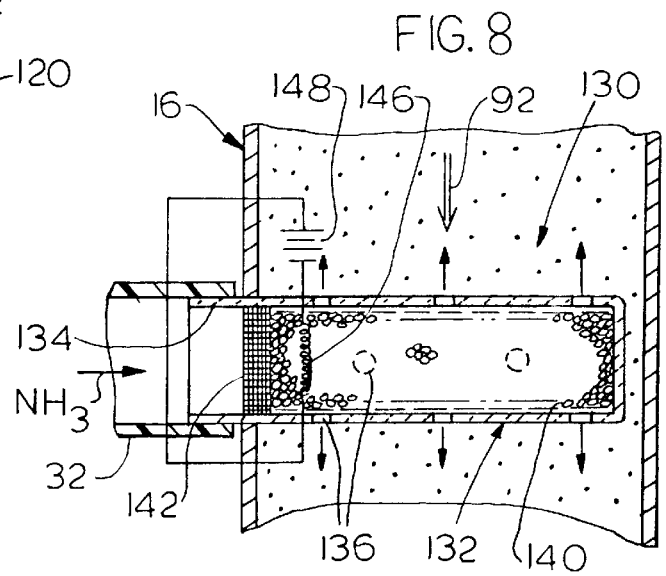
FIG. 8 is a partial sectional view of an injector of another embodiment of the invention, which is constructed to activate ammonia prior to injecting it into the exhaust gas stream.

FIG. 8 shows one example of an ammonia injector 130 which is constructed to activate ammonia immediately prior to or during injection. The injector 130 includes a housing 132 with an inlet 134, and with an outlet formed by six holes 136 lying in the exhaust conduit 16. Numerous particles 140 of a catalytic material (which is catalytic to $NH_3$) such as a metal of the platinum group, iron, nickel, or zinc are held in the housing, with a screen 142 being used to prevent their loss. Pumped in ammonia passes between the granules prior to exiting through the holes 136. The granules activate the ammonia ($NH_3$) by splitting some of it into its reactive components prior to exit of the gas into the exhaust gas stream 92. Activation is enhanced by the fact that the granules 140 are heated to a high temperature by the exhaust gases passing over the injector. For a short period after engine startup, the granules can be heated by a heater element 146 connected to a current source 148. The ammonia itself can be preheated prior to reaching the injector.

The housing 132 of the injector 130 of FIG. 8, is somewhat similar to the injector 90 of FIG. 3, in that it includes a plurality of holes 136 (6 being indicated) to distribute the ammonia throughout the exhaust gases. Applicant prefers to use granules of a small size, such as of a diameter of no more than about 2 mm, and preferably much less. This results in narrow passages between adjacent granules, with the narrow passages having an average cross-section of no more than about one square millimeter, and preferably no more than 0.1 mm². In passing between the inlet 134 and one of the outlet holes 136, the ammonia moves along a hot passage (spaces between granules) having a length more than ten times its average width (preferably more than 50 times its width), resulting in considerable heating of the ammonia which results in activating it. The narrow and long passages also aid in bringing the ammonia into contact with the catalytic material of the granules, to help activate it, in addition to heating the ammonia (preferably to at least 500° F. or 260° C.).

Figure 9:
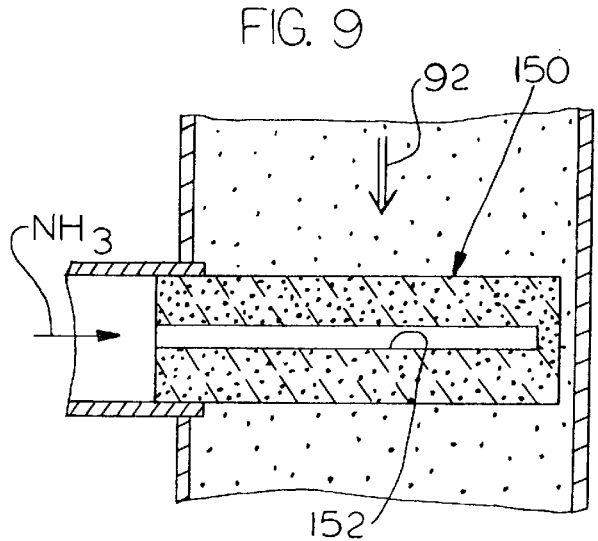
FIG. 9 is a partial sectional view of an injector of still another embodiment of the invention, which activates ammonia prior to its injection.

FIG. 9 illustrates another injector 150 which is similar to that of FIG. 8, except that the injector of FIG. 9 is formed of sintered particles of a catalytic material, with the ammonia exiting through pores in the sintered injector into the gas stream 92. A passage 152 has been formed in the center of the injector to more evenly distribute the ammonia.

Figure 10:
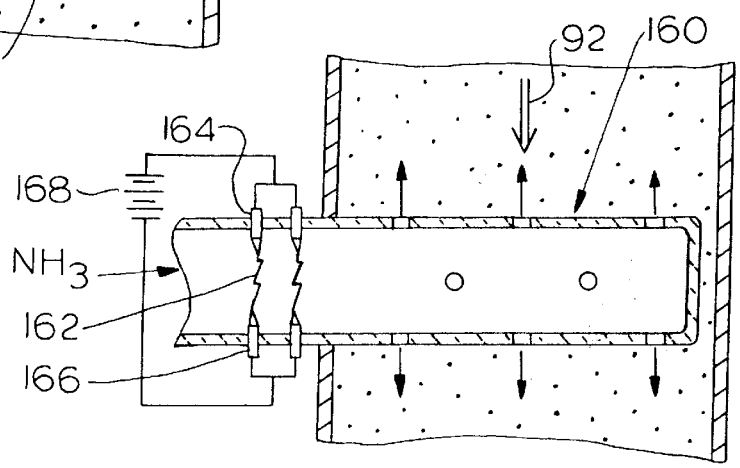
FIG. 10 is a partial sectional view of an injector of yet another embodiment of the invention, which activates ammonia prior to its injection.

FIG. 10 illustrates another injector 160 wherein arcs at 162 are created to activate ammonia. The injector includes electrodes 164, 166 and a high voltage (e.g. 20 kilovolts) source 168 connected between the electrodes to produce activating arcs through which the ammonia passes. Any input of energy to ammonia, such as from a laser beam, electron beam, etc. immediately prior to ammonia injection (preferably less than a minute and more preferably less than ten seconds, and while the ammonia is moving toward or through the injector), can help to activate the ammonia.

Referring back to FIG. 2, it can be seen that the fuel injector 60 which injects fuel into the cylinder 50, is energized by electrical pulses 170 received from a circuit 172. The width 174 of each pulse determines how long the valve is open during each cycle, to thereby determine how much fuel is delivered to the cylinder of the engine. A wire 176 (actually at least two wires are required) carries the same output pulses 170 that are delivered to the fuel injector, to a circuit 180 that controls operation of the solenoid valve 72 that meters the flow of ammonia to an ammonia injector such as 90. Gaseous ammonia is supplied to the valve 78 at a valve conduit 80 where gaseous ammonia is at a predetermined pressure that is usually 10 psi or less (e.g. 2 to 5 psi, depending on the particular engine) as regulated by the pressure regulator 70. Every time a pulse 182 is delivered by circuit 180 to the solenoid 76, the solenoid pulls the valve member 78 to open it for a short time, to deliver ammonia to the hose 36 that carries it to the injector. The width of the pulse 182 determines how long the valve member 78 will lie in its open position, and therefore determines the amount of ammonia that will be dispensed. It is noted that ammonia flow from the hose 36 and through the injector 90 into the exhaust pipe or conduit 16 is substantially continuous and without pulses.

In one example, an automobile is moving at 40 mph, with its engine rotating at 1800 rpm or 30 rps (revolutions per second). The circuit 172 that delivers electrical pulses to the fuel injectors, delivers 15 pulses per second to each of 8 cylinders. Applicant takes the electrical output on one of the eight lines, which carries 15 pulses per second, or one pulse every 67 ms (milliseconds). The circuit 180 can merely amplify these pulses, but preferably divides them so as to produce less frequent pulses on line 74, such as one pulse every 670 ms.

Figures 11, 12:
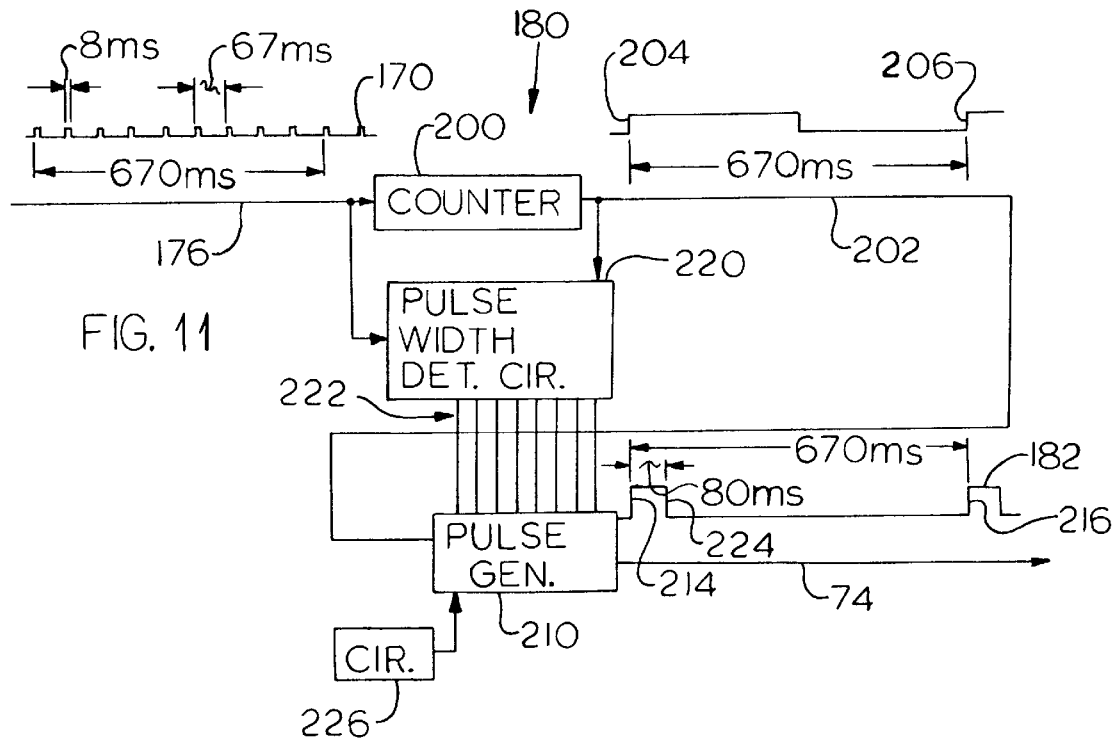
FIG. 11 is a simplified schematic diagram of an electronic circuit of the system of FIG. 2.
FIG. 12 illustrates an ammonia injection system of another embodiment of the invention.

FIG. 11 provides an example of the circuit 180, which receives pulses 170 every one-fifteenth second, or every 67 ms on line 176. In a particular example, it is assumed that each pulse to the fuel injector has a duration of 8 ms to produce a predetermined fuel flow and power output. The fuel injecting pulses on line 176 are delivered to a counter 200, which applicant assumes to count by ten to aid in the illustration. The counter output on line 202 has positive going edges at 204, 206 that are spaced apart by 670 milliseconds, or ten times the spacing of the original pulses. The output on line 202 is delivered to a pulse generator 210 which delivers pulses on line 74, with their leading edges 214, 216 being spaced apart by 670 milliseconds. The duration of each pulse is determined by a pulse width detector circuit 220 which detects the duration (e.g. 8 ms) of each fuel injection pulse 170 on line 176, and whose output 222 is a count indicating the duration of the desired pulse. The output 222 is delivered to the pulse generator 210, to determine the duration of each pulse, with the particular pulse output 224 having a duration of 80 ms. Thus, the duration of fuel injection signals, or the proportion of the time they exist (e.g. 8 ms every 67 ms, or 12% of the time), is used to control the flow rate of ammonia into the exhaust conduit.

Although the fuel injector 70 (FIG. 2) of the engine must react very rapidly, the provision of a divider circuit 180 enables the use of a solenoid valve which has a much slower reaction time, and which is therefore of lower cost. The fact that applicant uses already-available electrical signals that indicate the amount of NOx production, avoids the need for providing and installing a sensor (and sealing the hole through which the sensor is installed). The electronics for amplifying the fuel injector pulses and dividing them, is of relatively low cost, compared to the cost of providing a separate sensor along the air manifold, fuel line, or exhaust manifold, installing the sensor, and providing a circuit to process the signals. It should be noted that an additional circuit 226 is provided to control the pulse generator so no pulses are delivered during idling of a hot engine and to otherwise vary the ammonia flow in accordance with engine operation. However, the flow rate of ammonia is generally increased and decreased as the duration of fuel valve pulses respectively increases and decreases.

FIG. 12 illustrates a system 230 that is based on a system described in U.K. patent application 2,274,412A. That patent application describes a bed 232 of pellets 234 that have a high dielectric constant and ferro-electric properties, such as barium titanate. A pair of metal grids 240, 242 lie at opposite ends of the bed and are connected to a high voltage source (e.g. 20 kilovolts) 244. The bed helps to reduce nitrogen oxides (even in the absence of ammonia), as well as oxidizing soot particles. It is noted that the exhaust gas stream 92 passes through the bed 232, rather than merely passing by (i.e. near) the bed.

In accordance with one aspect of the present invention, applicant connects an ammonia source 246 (including a tank, metering valve, and control) to an inlet 250 near the upstream end of the bed 234. The presence of barium titanate particles and the ionizing energy from the high voltage source 244, promotes the activation of ammonia, with the bed also helping to mix the ammonia into the exhaust gases. The combination of the bed 232 with the high voltage source 244 connected thereto, which is described in the above U.K. patent application, with applicant's ammonia injection, results in a great reduction NOx, while also reducing soot.

Thus, the invention provides a system for injecting ammonia or its components into a stream of exhaust gases from an engine, which effectively uses the ammonia to reduce nitrogen oxide emissions. The ammonia is injected into the exhaust gas conduit at several spaced locations to help distribute the ammonia throughout the exhaust gases while they are still very hot. The ammonia is activated, so at least ten percent of the ammonia is split into $NH_2$ and/or NH so these highly reactive components are injected into the exhaust gas stream to begin reactions while the exhaust gas is very hot. The ammonia can be broken down by heating it, especially by passing the ammonia through long narrow passages whose walls are formed of a catalyzing material such as a metal of the platinum group, iron, nickel, or zinc. The injector with holes through which ammonia is injected into the exhaust gas stream, preferably includes a body lying within the exhaust gas stream to be heated to a high temperature (at least 500° F.) thereat, to heat ammonia passing therethrough. Control of the amount of ammonia so it is roughly proportional to the amount of nitrogen oxides created, is simplified by using the duration of signals delivered to fuel injectors of the engine to control ammonia flow.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. In an engine which includes means for combusting hydrocarbons in air to produce work wherein said means also produces a stream of exhaust gasses that contain nitrogen oxides, with the engine having an exhaust conduit through which the exhaust gasses are passed before being emitted into the atmosphere, the improvement comprising:

a source of ammonia;

an injector apparatus coupled to said source to receive ammonia therefrom and inject the ammonia into said exhaust gas conduit;

said injector apparatus including an ammonia-carrying conduit with an injector lying within said exhaust conduit, said injector having at least one opening through which said ammonia is injected into said stream of exhaust gasses;

means for heating said ammonia and flowing said ammonia past a catalyzing material to activate the ammonia after the ammonia has left said source and before the ammonia has been injected into said exhaust conduit and before the ammonia comes in contact with said exhaust gases, so said ammonia is heated to decompose part of said ammonia before the ammonia with a decomposed part comes in contact with said exhaust gases.

2. The engine described in claim 1 wherein:

said means for heating includes a body having a multiplicity of parallel passage portions, that lie within said exhaust conduit and that each has a thickness of no more than 1 mm and a length of more than ten times its average thickness, where said body is heated by exhaust gasses and in turn heats ammonia moving through said passage portions to activate said ammonia.

3. The engine described in claim 1 wherein said means for combusting includes a fuel injector valve positioned to inject said hydrocarbons into said air to create a fuel-air mixture for combusting, and an electronic fuel injector circuit that generates electrical currents whose time durations at least partially determine the average flow rate of fuel that is injected into said air, the improvement comprising:

ammonia injection apparatus that includes said injector and a control that is coupled to said electronic fuel injector circuit and that controls operation of said injector to respectively increase and decrease the flow rate of ammonia injected by said injector into said exhaust conduit as the average time durations of said electrical currents increase and decrease.

4. The engine described in claim 1 wherein:

said injector comprises a body of sintered particles forming microscopic passages.

5. A method for reducing nitrogen oxides in the exhaust gasses of an engine that combusts hydrocarbon in the presence of air and that produces a stream of exhaust gasses, comprising:

passing ammonia in a gaseous state to provide ammonia gas, to an injector and injecting at least components of the ammonia gas from said injector, into said stream of exhaust gasses;

activating said ammonia gas to break down at least 10% of said ammonia gas into components of ammonia, prior to injecting said ammonia gas and components into said stream of exhaust gasses and prior to allowing said ammonia gas to come into direct contact with said exhaust gases.

6. The method described in claim 5 wherein:

said step of activating includes activating said ammonia gas to decompose more than 10% of the ammonia gas into $NH_2$ and NH and hydrogen, within a period of 10 seconds prior to injecting said ammonia gas into said stream of exhaust gases.

7. An engine which has a fuel injector apparatus positioned to inject hydrocarbon fuel into masses of air to combust them and produce work and to also produce a stream of exhaust gases that contain nitrogen oxides, with the engine having an exhaust conduit through which said stream of exhaust gases flow before being emitted into the environment, and with said fuel injector apparatus including an electronic fuel injector circuit that generates electrical currents whose time durations at least partially determine the average flow rate of fuel that is injected into said masses of air, the improvement comprising:

ammonia injection apparatus comprising an injector coupled to said exhaust conduit to inject ammonia into said stream of exhaust gases, and a control that is coupled to said electrical currents of said electronic fuel injector circuit and that controls operation of said injector to respectively increase and decrease the flow rate of ammonia injected by said injector into said exhaust conduit as the average time durations of said electrical currents increase and decrease.

8. The engine described in claim 7 wherein:

said ammonia injection apparatus includes a source of pressured ammonia, an electrically operated valve, and walls forming an ammonia-carrying passageway that extend from said source to said injector through said valve;

said control includes a divider circuit that produces control signals that are each of a duration that is a predetermined multiple of more than one of said electrical currents generated by said electronic fuel injector circuit, and an electrical conductor that carries said control signals to said valve to open it for periods of time each equal to the duration of one of said control signals.

9. A method for controlling the injection of ammonia through an electrically operated valve into an exhaust gas conduit of an engine, where said engine includes a fuel injector and an electronic fuel injector circuit that generates fuel injection control currents whose average duration per unit of time determines the flow rate of fuel through said fuel injector, comprising:

using said fuel injection control currents to control the opening of said valve to flow ammonia through said valve at a flow rate that is generally proportioned to the duration per unit of time of said injection control currents.

10. In an engine which includes means for combusting hydrocarbons in air to produce work wherein said means also produces a stream of exhaust gases that contain nitrogen oxides, with the engine having an exhaust conduit through which the exhaust gases are passed before being emitted into the atmosphere, the improvement comprising:

a source of ammonia;

an injector apparatus coupled to said source to receive ammonia therefrom and inject it into said exhaust gas conduit;

said injector apparatus including an ammonia-carrying body forming a plurality of ammonia-carrying passages that each has an average width and that each has an average cross-section of less than 1 $mm^2$ and a length at least 10 times its average width;

means for heating said body to decompose at least 10% of the ammonia being injected, prior to allowing said ammonia to come into contact with said exhaust gases of said stream of exhaust gases.

11. The engine described in claim 10 wherein:

said body includes catalyzing material to decompose said ammonia, with said catalyzing material lying along said passages.

12. In an apparatus for receiving ammonia and injecting at least components of the ammonia into a stream of exhaust gasses of an engine the improvement, comprising:

means for activating said ammonia to decompose at least 10% of the ammonia into ammonia components prior to injecting said activated ammonia into said stream of exhaust gasses, with said means for activating being constructed to isolate said ammonia from said stream of exhaust gasses until at least 10% of the ammonia that is being injected into the stream of exhaust gasses has already been decomposed prior to said injection;

said means for activating including a body comprising material that is catalyzing to ammonia to decompose ammonia, said body lying in said stream of exhaust gasses, with said body having multiple parallel ammonia carrying passages that each have a length that lies within said stream of exhaust that is at least 10 times the average width of the passage.

13. In an apparatus for receiving ammonia and injecting at least components of the ammonia into a stream of exhaust gasses of an engine the improvement, comprising:

means for activating said ammonia to decompose at least 10% of the ammonia into ammonia components prior to injecting said activated ammonia into said stream of exhaust gasses, with said means for activating being constructed to isolate said ammonia from said stream of exhaust gasses until at least 10% of the ammonia that is being injected into the stream of exhaust gasses has already been decomposed prior to said injection;

said means for activating comprising a body having multiple ammonia-carrying passages that each has a cross-section of less than 1 $mm^2$ and a length at least 10 times its width, and an electrically powered heater coupled to said body to heat said body.

14. A method for reducing nitrogen oxides in the exhaust gasses of an engine that combusts hydrocarbon in the presence of air and that produces a stream of exhaust gasses, comprising:

passing ammonia from a source to an injector and injecting at least components of the ammonia from said injector, into said stream of exhaust gasses;

activating said ammonia to break down at least 10% of said ammonia into components of ammonia, prior to injecting said ammonia and components into said stream of exhaust gasses and prior to allowing said ammonia to come into direct contact with said exhaust gases;

said step of activating includes positioning a body with passage walls forming at least one elongated passage having a length at least 10 times its average diameter, so a length of said passage which is at least 10 times its average diameter lies in said stream of exhaust gases and allowing the heat of said exhaust gases to heat said passage walls, and passing said ammonia through said at least one passage prior to injecting said ammonia into said stream of exhaust gases to allow said passage walls to heat said ammonia to at least 500° F.

15. A method for reducing nitrogen oxides in the exhaust gasses of an engine that combusts hydrocarbon in the presence of air and that produces a stream of exhaust gasses, comprising:

passing ammonia from a source to an injector and injecting at least components of the ammonia from said injector, into said stream of exhaust gasses;

activating said ammonia to break down at least 10% of said ammonia into components of ammonia, prior to injecting said ammonia and components into said stream of exhaust gasses and prior to allowing said ammonia to come into direct contact with said exhaust gases;

said step of activating includes heating said ammonia in the presence of a catalyst prior to said step of injecting and prior to allowing said ammonia to come into contact with said exhaust gases.

* * * * *